(12) United States Patent
Mae et al.

(10) Patent No.: US 10,396,609 B2
(45) Date of Patent: Aug. 27, 2019

(54) PERMANENT MAGNET-EMBEDDED TYPE ROTARY ELECTRIC MACHINE WITH ROTOR HAVING SLOTS AND ROTOR SURFACE GROOVES

(71) Applicant: FUJI ELECTRIC CO., LTD., Kawasaki-shi (JP)

(72) Inventors: Kenichi Mae, Hino (JP); Hideki Oguchi, Hino (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 138 days.

(21) Appl. No.: 14/457,774

(22) Filed: Aug. 12, 2014

(65) Prior Publication Data

US 2015/0061447 A1    Mar. 5, 2015

(30) Foreign Application Priority Data

Sep. 3, 2013    (JP) .................................. 2013-182266

(51) Int. Cl.
*H02K 1/27* (2006.01)
*H02K 29/03* (2006.01)

(52) U.S. Cl.
CPC ............ *H02K 1/2766* (2013.01); *H02K 29/03* (2013.01); *H02K 1/276* (2013.01)

(58) Field of Classification Search
CPC ........ H02K 1/2766; H02K 29/03; H02K 1/27; H02K 1/276; H02K 9/03; H02K 15/024

(Continued)

(56) References Cited

U.S. PATENT DOCUMENTS

| 5,508,576 | A | * | 4/1996 | Nagate | .................... | C08L 23/02 |
| | | | | | | 310/156.54 |
| 6,034,459 | A | * | 3/2000 | Matsunobu | ............ | H02K 1/276 |
| | | | | | | 310/156.38 |

(Continued)

FOREIGN PATENT DOCUMENTS

| EP | 2348611 A1 | 7/2011 |
| JP | 2004-343861 A | 12/2004 |

(Continued)

OTHER PUBLICATIONS

JP 2011083164 A English Translation.*
Extended European Search Report dated Feb. 12, 2016.

*Primary Examiner* — Julio C. Gonzalez
*Assistant Examiner* — Maged M Almawri
(74) *Attorney, Agent, or Firm* — Rabin & Berdo, P.C.

(57) ABSTRACT

Magnetic flux short-circuit preventing slits extend from opposite ends of two permanent magnets in an outer circumferential surface of a rotor toward a center of a magnetic pole. Grooves formed in the outer circumferential surface can be located at a distance from each other symmetrically with respect to the center of the magnetic pole and at a distance from a groove of an adjacent magnetic pole in the outer circumferential surface. Relations are established as $\theta f = n \times \tau s$ and $\theta s = n \times \tau s$ where $\tau s$ designates a pitch of stator winding slots, which pitch is converted into an angle around a rotation center, $\theta f$ designates an angle between the magnetic flux short-circuit preventing slits, $\theta s$ designates an angle between the grooves, and n designates a predetermined integer. Thereby, a permanent magnet-embedded type rotary electric machine in which the influence of a manufacturing error can be minimized so that cogging torque can be reduced stably.

18 Claims, 6 Drawing Sheets

(58) Field of Classification Search
USPC ............. 310/156.01–156.54, 156.56, 156.57
See application file for complete search history.

(56) References Cited

U.S. PATENT DOCUMENTS

| | | | | |
|---|---|---|---|---|
| 6,133,662 | A * | 10/2000 | Matsunobu | H02K 1/278 310/156.12 |
| 6,486,581 | B2 * | 11/2002 | Miyashita | H02K 1/276 310/156.01 |
| 6,597,079 | B2 * | 7/2003 | Miyashita | H02K 1/276 310/156.48 |
| 6,867,526 | B2 * | 3/2005 | Mori | H02K 1/276 310/156.57 |
| 7,119,507 | B2 * | 10/2006 | Nishijima | H02K 1/276 318/400.41 |
| 7,151,335 | B2 * | 12/2006 | Tajima | H02K 1/2766 310/156.48 |
| 7,230,359 | B2 * | 6/2007 | Iles-Klumpner | H02K 1/276 310/156.53 |
| 7,327,062 | B2 * | 2/2008 | Kaneko | H02K 1/276 310/156.53 |
| 7,605,510 | B2 * | 10/2009 | Okuma | H02K 1/276 310/156.53 |
| 7,843,101 | B2 * | 11/2010 | Ito | H02K 1/2766 310/156.46 |
| 8,179,011 | B2 * | 5/2012 | Takemoto | H02K 1/276 310/156.53 |
| 8,193,672 | B2 * | 6/2012 | Oh | |
| 8,368,273 | B2 * | 2/2013 | Hino | H02K 1/276 310/156.47 |
| 8,405,270 | B2 * | 3/2013 | Li | H02K 1/276 310/156.46 |
| 8,643,239 | B2 * | 2/2014 | Takemoto | H02K 1/276 310/156.45 |
| 8,659,200 | B2 * | 2/2014 | Adaniya | H02K 1/276 310/156.46 |
| 9,985,484 | B2 * | 5/2018 | Liang | H02K 1/2766 |
| 2001/0028201 | A1 * | 10/2001 | Miyashita | H02K 1/276 310/156.38 |
| 2002/0047432 | A1 * | 4/2002 | Miyashita | H02K 1/276 310/156.48 |
| 2002/0047434 | A1 * | 4/2002 | Koharagi | H02K 1/2766 310/156.56 |
| 2002/0171309 | A1 * | 11/2002 | Wakui | H02K 1/276 310/156.48 |
| 2003/0178905 | A1 * | 9/2003 | Koharagi | H02K 1/2766 310/156.38 |
| 2003/0222526 | A1 * | 12/2003 | Matsunobu | H02K 1/276 310/156.45 |
| 2004/0017123 | A1 * | 1/2004 | Miyashita | H02K 21/14 310/156.53 |
| 2004/0130231 | A1 | 7/2004 | Fratta | |
| 2005/0168089 | A1 * | 8/2005 | Miyashita | H02K 29/03 310/156.57 |
| 2005/0200223 | A1 * | 9/2005 | Tajima | H02K 1/2766 310/156.46 |
| 2007/0126305 | A1 * | 6/2007 | Okuma | H02K 1/276 310/156.53 |
| 2007/0200447 | A1 * | 8/2007 | Adaniya | H02K 1/276 310/156.53 |
| 2008/0203842 | A1 * | 8/2008 | Yoshikawa | H02K 1/276 310/156.01 |
| 2010/0194228 | A1 * | 8/2010 | Lee | H02K 29/03 310/156.53 |
| 2012/0019089 | A1 * | 1/2012 | Takemoto | H02K 1/276 310/156.54 |
| 2012/0139386 | A1 * | 6/2012 | Murakami | H02K 1/146 310/216.092 |
| 2014/0361646 | A1 * | 12/2014 | Saito | H02K 3/28 310/51 |
| 2015/0256038 | A1 * | 9/2015 | Nigo | H02K 1/276 62/498 |
| 2018/0309333 | A1 * | 10/2018 | Makino | H02K 21/14 |

FOREIGN PATENT DOCUMENTS

| | | | | |
|---|---|---|---|---|
| JP | 2005-261024 A | | 9/2005 | |
| JP | 2007-159197 A | | 6/2007 | |
| JP | 2011-083164 A | | 4/2011 | |
| JP | 2011083164 A | * | 4/2011 | ............. H02K 1/08 |
| WO | WO 02-078151 A2 | | 10/2002 | |
| WO | WO 2013108680 A1 | * | 5/2012 | ............. H02K 1/276 |

* cited by examiner

PERMANENT MAGNET-EMBEDDED TYPE ROTARY ELECTRIC MACHINE WITH ROTOR HAVING SLOTS AND ROTOR SURFACE GROOVES

BACKGROUND OF THE INVENTION

1. Field of the Invention

The present invention relates to a rotary electric machine with a rotor, such as an electric motor or a power generator. Particularly, it relates to a permanent magnet-embedded type rotary electric machine in which at least one permanent magnet is embedded in a rotor.

2. Description of the Background Art

In a permanent magnet-embedded type rotary electric machine, cogging torque occurs when a rotor is rotated even in a non-excited state. The cogging torque should be minimized because the cogging torque is a disturbance in the control of the rotary electric machine. One of measures for reducing the cogging torque is a measure in which an oblique skew is applied to a stator or a stepwise skew is applied to a rotor. However, when this measure is taken, there is a problem that the number of manufacturing steps increases. As a technique for reducing cogging torque without applying any skew to a stator or a rotor, there is, for example, a technique disclosed in JP-A-2004-343861. According to the technique in JP-A-2004-343861, a range through which magnetic flux can pass is limited by slits provided in end portions of each magnetic pole of a rotor, and the width of the range is defined based on the pitch of slots for stator windings so as to reduce cogging torque.

The aforementioned background-art permanent magnet-embedded type rotary electric machine has a problem that cogging torque may fluctuate unstably when the dimensions of the slit for limiting the width of the range through which magnetic flux can pass differ from its design dimensions due to the influence of a manufacturing error.

SUMMARY OF THE INVENTION

The invention has been developed in consideration of the aforementioned circumstances. An object of the invention is to provide a permanent magnet-embedded type rotary electric machine in which the influence of a manufacturing error can be minimized so that cogging torque can be reduced stably.

According to the invention, there is provided a permanent magnet-embedded type rotary electric machine including: a stator which has a plurality of stator winding slots formed in an inner circumferential surface thereof; and a rotor which is rotatably supported so that an outer circumferential surface of the rotor can be opposed to the inner circumferential surface of the stator through a gap, one permanent magnet or a plurality of permanent magnets being embedded in the rotor so as to form a plurality of magnetic poles arrayed in a rotation direction in the outer circumferential surface of the rotor; wherein: magnetic flux short-circuit preventing slits are formed in the rotor so as to extend from opposite ends of the permanent magnet or the permanent magnets forming each of the magnetic poles in the outer circumferential surface of the rotor toward a center of the magnetic pole; and pairs of grooves are formed in the outer circumferential surface of the rotor so that each pair of grooves are located at a distance from each other symmetrically with respect to a symmetry axis passing through the center of corresponding one of the magnetic poles and each of the pair of grooves is located at a distance from a groove of an adjacent magnetic pole in the outer circumferential surface of the rotor.

According to the invention, due to the magnetic flux short-circuit preventing slits provided in the rotor and the pairs of grooves provided in the outer circumferential surface of the rotor, a range through which magnetic flux can pass between the rotor and the stator is limited properly even in a situation where a manufacturing error occurs. Thus, cogging torque can be reduced stably.

DETAILED DESCRIPTION OF THE INVENTION

Embodiments of the invention will be described below with reference to the drawings.

Figure 1:
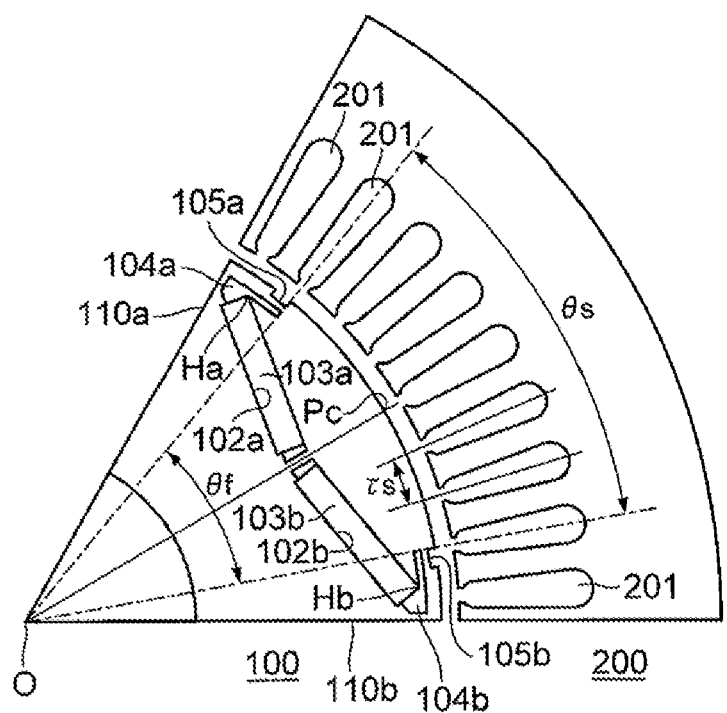
FIG. 1 is a cross-sectional view showing the configuration of an IPM motor as an embodiment of a permanent magnet-embedded type rotary electric machine according to the invention.

FIG. 1 is a cross-sectional view showing the configuration of an IPM motor as an embodiment of a permanent magnet-embedded type rotary electric machine according to the invention, which is cut along a plane perpendicular to a rotation axis thereof. The IPM motor according to the embodiment includes a six-pole rotor 100 using two permanent magnets 103a and 103b for each pole, and a stator 200 receiving the rotor 100. In the following description, for the sake of convenience of explanation, the rotor 100 will be divided into six regions each including two permanent magnets 103a and 103b, and each of these regions will be referred to as a magnetic pole region of the rotor 100 corresponding to one pole.

FIG. 1 shows the configuration of a magnetic pole region of the rotor 100 corresponding to one pole and a ⅙ region of the stator 200 opposed thereto, in order to prevent the drawing from being complicated. As shown in FIG. 1, the magnetic pole region of the rotor 100 corresponding to one pole is put within a range of an opening angle of 60 degrees between an inter-magnetic pole boundary 110a and an inter-magnetic pole boundary 110b and around a rotation center O of the rotor 100. The structure of a region which is counterclockwise (or clockwise) adjacent to the region including the illustrated rotor 100 and the illustrated stator 200 is a structure in which the illustrated rotor 100 corresponding to one pole and the illustrated stator 200 are folded back with respect to the inter-magnetic pole boundary 110a (or 110b).

The stator 200 has a hollow cylindrical shape. A plurality of stator winding slots 201 arrayed at a pitch τs in a rotation direction of the rotor 100 is formed in an inner circumferential wall of the stator 200. In this example, fifty-four stator winding slots 201 are formed in the inner circumferential surface of the stator 200. Accordingly, the pitch τS of the stator winding slots 201 is 360 degrees/54=6.67 degrees. In addition, nine stator winding slots 201 within an angle range (60 degrees) corresponding to one pole are depicted in FIG. 1.

In the magnetic pole region of the rotor 100 corresponding to one pole, two permanent magnet embedding slits 102a and 102b are formed into a V-shape spreading toward an outer circumferential surface of the rotor 100. Permanent magnets 103a and 103b each having a rectangular shape in section are embedded into the permanent magnet embedding slits 102a and 102b. These permanent magnets 103a and 103b turn their magnetic poles with one and the same polarity toward the outer circumferential surface of the rotor 100 so as to forma single magnetic pole in the outer circumferential surface of the rotor 100. In this example, in the outer circumferential surface of the rotor 100, a center Pc of the magnetic pole is located in a position on a straight line extending from the rotation center O of the rotor 100 and going through a center between the permanent magnets 103a and 103b.

Magnetic flux short-circuit preventing slits 104a and 104b are formed in the rotor 100. Here, the magnetic flux short-circuit preventing slit 104a (or 104b) communicates with, of opposite ends of the magnet embedding slit 102a (or 102b), an end portion closer to the inter-magnetic pole boundary 110a (or 110b), so as to extend toward the center Pc of the magnetic pole. The range through which the magnetic flux between the rotor 100 and the stator 200 can pass is limited between and by these magnetic flux short-circuit preventing slits 104a and 104b, so that magnetic flux not going by way of the stator 200 but merely passing through the rotor 100 can be prevented from occurring.

In addition, a pair of grooves 105a and 105b located at a distance from each other symmetrically with respect to a symmetric axis penetrating the center Pc of the magnetic pole are formed in the outer circumferential surface of the rotor 100. Each of these grooves 105a and 105b is located at a distance from a groove 105a or 105b (not shown) in an adjacent magnetic pole region.

Next, more specific description will be made on the positional relationship between the magnetic flux short-circuit preventing slits 104a and 104b and the grooves 105a and 105b.

In this embodiment, when θf designates an angle around the rotation center O of the rotor 100 put between the two magnetic flux short-circuit preventing slits 104a and 104b, θs designates an angle around the rotation center O of the rotor put between the pair of grooves 105a and 105b, and n designates a predetermined integer, the angles θf and θs are decided to satisfy the following Expressions (1) and (2).

$$\theta f = n \times \tau s \quad (1)$$

$$\theta s = n \times \tau s \quad (2)$$

In the example shown in FIG. 1, n=6. In addition, τs=6.67 degrees. Therefore, θf=θs=6×6.67 degrees=40 degrees.

When the magnetic flux short-circuit preventing slits 104a and 104b are provided to satisfy the aforementioned Expression (1), magnetic flux from the rotor 100 is introduced to the stator 200 only through a region in a range expressed by θf=n×τs in the outer circumferential surface of the rotor 100. As a result, a higher-order component corresponding to the pitch τs of the stator winding slots 201 can be reduced in a rotation-direction magnetic flux density waveform in the outer circumferential surface of the rotor 100, so that cogging torque can be reduced.

In addition, when the grooves 105a and 105b are provided to satisfy the aforementioned Expression (2), the region on the outer circumferential surface of the rotor 100 passed through by the magnetic flux from the rotor 100 toward the stator 200 can be limited more completely than when only the magnetic flux short-circuit preventing slits 104a and 104b are provided. Accordingly, it can be expected to reduce cogging torque more stably.

It can be considered that the aforementioned angles θf and θs may be displaced from their design sizes in a real machine due to various manufacturing factors. When the aforementioned angles θf and θs are slightly displaced from the design sizes decided in accordance with the aforementioned Expressions (1) and (2), cogging torque may vary unstably.

Therefore, according to a modification of the embodiment, the design sizes of the angles θf and θs are decided in accordance with the following Expressions (3) and (4) in order to reduce cogging torque stably even in a situation where the angles θf and θs may be displaced from the design sizes in a real machine.

$$n \times \tau s - \Delta \theta \leq \theta f \leq n \times \tau s + \Delta \theta 2 \quad (3)$$

$$\theta s = n \times \tau s \quad (4)$$

In the aforementioned Expression (3), Δθ1 and Δθ2 designate predetermined constants. For example, each of the values of Δθ1 and Δθ2 is in a range of from 0 to 1 degree.

Figure 2:
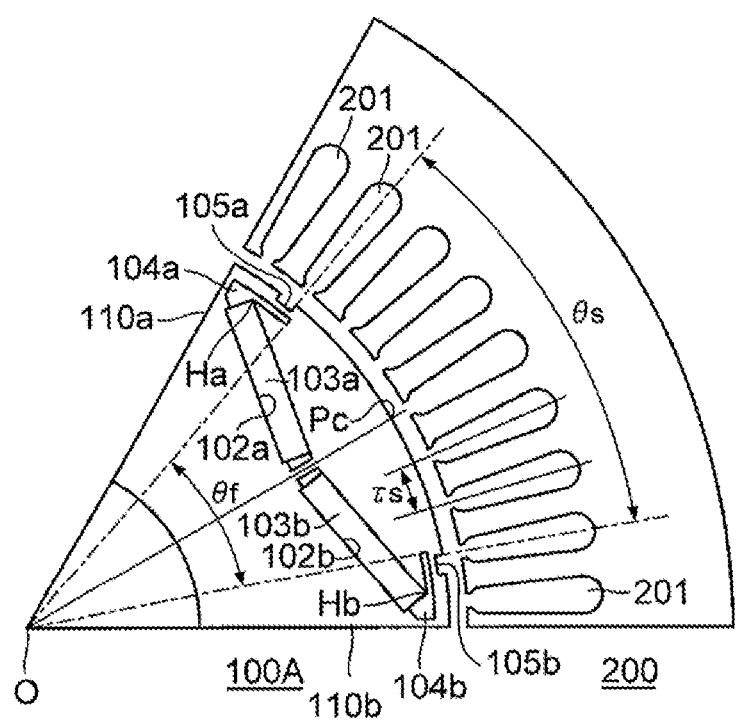
FIG. 2 is a cross-sectional view showing the configuration of a modification of the IPM motor.

FIG. 2 is a cross-sectional view showing the configuration of the modification. In this modification, a rotor 100A has an angle θf displaced from an angle θs differently from the rotor 100 in FIG. 1. Specifically in this modification, τs=6.67 degrees, θs=n×τs=6×6.67 degrees=40 degrees, and θf=n×τs−1=40 degrees−1 degree=39 degrees.

Figure 3:
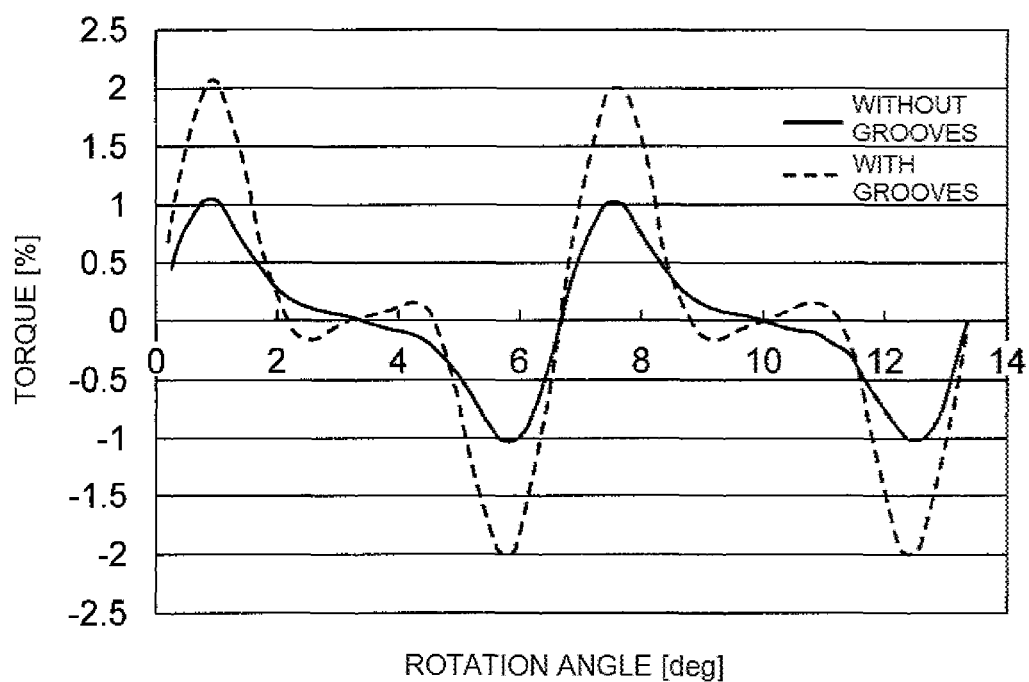
FIG. 3 is a graph showing the characteristic of cogging torque in the IPM motor according to the embodiment.

Next, the effect of the embodiment will be described with reference to FIG. 3 and FIG. 4. FIG. 3 is a graph showing the dependency of cogging torque on rotation angle, which dependency is obtained by performing magnetic field analysis on the IPM motor shown in FIG. 1. In FIG. 3, the abscissa designates a rotation angle of the rotor 100, and the ordinate designates cogging torque occurring in the rotor 100. When the rotor 100 in FIG. 1 is rotated as shown in FIG. 3, cogging torque occurring in the rotor 100 varies in a period of τs=6.67 degrees. In the configuration in which the grooves 105a and 105b are provided in the outer circumferential surface of the rotor 100 as shown in FIG. 1, the fluctuation width of the cogging torque from the peak value to the bottom value is 4.1%. On the other hand, in the configuration in which the grooves 105a and 105b are not provided in the outer circumferential surface of the rotor 100, the fluctuation width of the cogging torque from the peak value to the bottom value is 2.1%.

Figure 4:
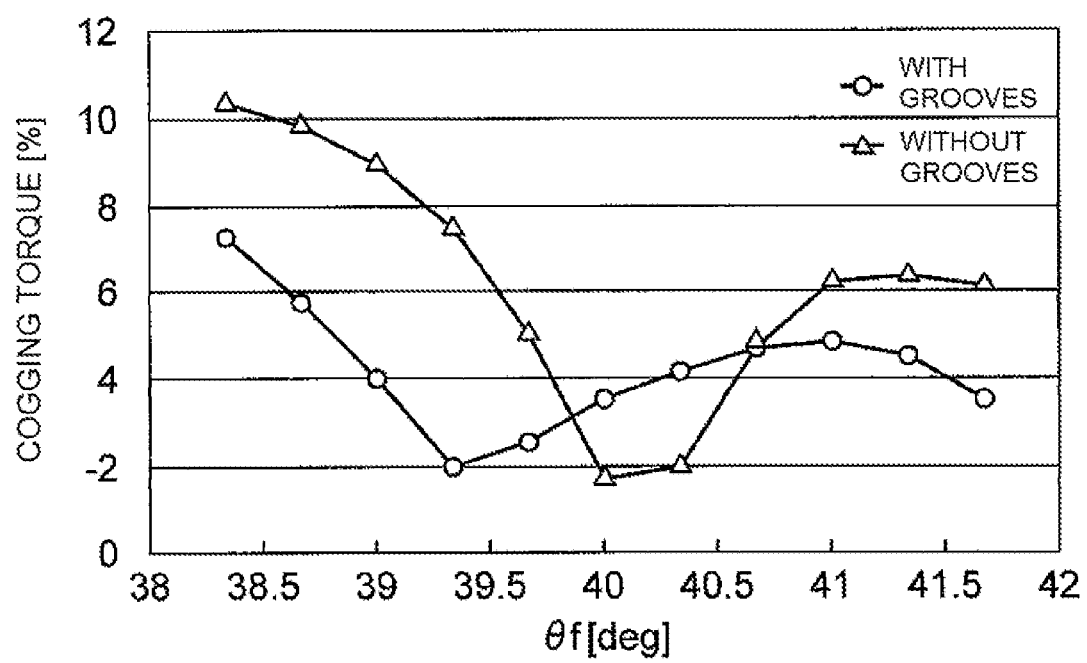
FIG. 4 is a graph showing the characteristic of cogging torque in the IPM motor according to the embodiment.

FIG. 4 is a graph showing the dependency of cogging torque on the angle θf when the angle θf is changed while the angle θs is fixed to 40 degrees in the case where the grooves 105a and 105b are provided in the IPM motor shown in FIG. 2. In FIG. 4, the abscissa designates the angle θf, and the ordinate designates the fluctuation width of cogging torque from the peak value to the bottom value when the rotation angle of the rotor 100 is changed. As shown in FIG. 4, in the condition of θf=θs=40 degrees, the fluctuation width of cogging torque in the case where the grooves 105a and 105b are provided becomes larger than that in the case where the grooves 105a and 105b are not provided also as shown in FIG. 3. However, in the region where the angle θf is displaced from the angle θs=40 degrees, the fluctuation width of cogging torque in the case where the grooves 105a and 105b are provided becomes stably smaller than that in the case where the grooves 105a and 105b are not provided.

According to the embodiment, as described above, the magnetic flux short-circuit preventing slits 104a and 104b are provided in the rotor 100, and the pair of grooves 105a and 105b are provided in the outer circumferential surface of the rotor 100. Thus, the influence of a manufacturing error can be minimized so that cogging torque can be reduced stably.

In addition, according to the embodiment, the groove 105a (or 105b) is located at a distance from a groove 105b (or 105a) of an adjacent magnetic pole region in the outer circumferential surface of the rotor 100. Accordingly, the magnetic resistance of a magnetic path passing through the inter-magnetic pole region (the region between the magnetic flux short-circuit preventing slit 104a (or 104b) and a magnetic flux short-circuit preventing slit 104b (or 104a) in an adjacent magnetic pole region) of the rotor 100 can be reduced to obtain high reluctance torque. In addition, since the groove 105a (or 105b) is located at a distance from a groove 105b (or 105a) of an adjacent magnetic pole region, the width of the region where the groove 105a (or 105b) faces the magnetic flux short-circuit preventing slit 104a (or 104b) can be narrowed so that a steel plate near the magnetic flux short-circuit preventing slit 104a (or 104b) in the rotor 100 can be prevented from being damaged.

In consideration of improvement of reluctance torque and prevention of the damage of the steel plate near the magnetic flux short-circuit preventing slit 104a (or 104b), it is desired not to excessively increase the width of each groove 105a, 105b in the rotation direction of the rotor 100. To this end, the limit position of the edge of the groove 105a (or 105b) on the magnetic pole boundary 110a (or 110b) side is set at a position which faces a vertex Ha (or Hb), which is the farthest point from the rotation center O of the permanent magnet 103a (or 103b), closer to the outer circumferential surface of the rotor 100 in the permanent magnet 103a (or 103b) and closer to the magnetic pole boundary 110a (or 110b). That is, the position of the edge of the groove 105a (or 105b) on the magnetic pole boundary 110a (or 110b) side is set at a position closer to the center Pc of the magnetic pole than the limit position facing the vertex Ha (or Hb).

Figure 5:
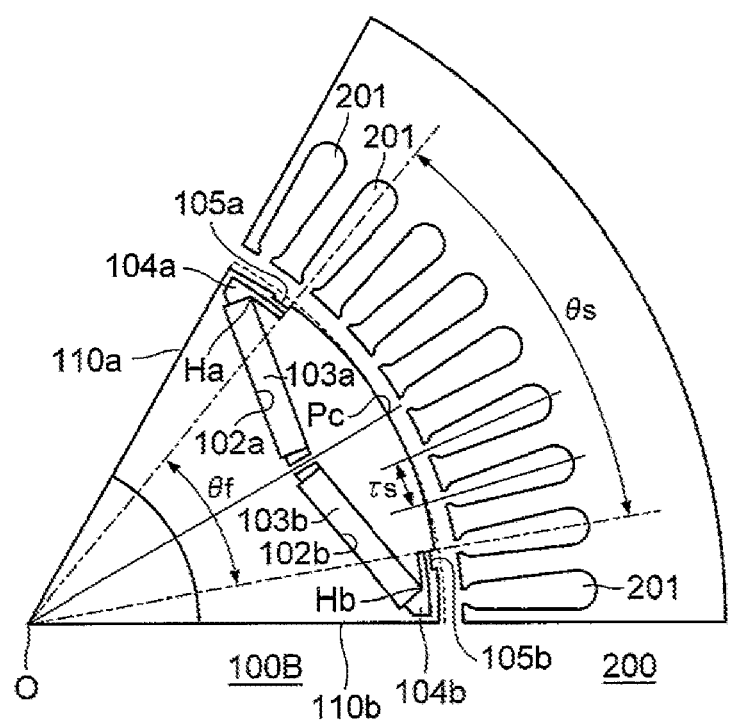
FIG. 5 is a cross-sectional view showing the configuration of an IPM motor as another embodiment of a permanent magnet-embedded type rotary electric machine according to the invention.

FIG. 5 is a cross-sectional view showing the configuration of an IPM motor as another embodiment of a permanent magnet-embedded type rotary electric machine according to the invention. In this IPM motor, the rotor 100A in FIG. 2 is replaced by a rotor 100B. This rotor 100B is different from the rotor 100A in FIG. 2. That is, the curvature radius of the outer circumferential surface of the rotor 100B is made smaller than the distance between the rotation center O and a point Pc closest to the stator 200 in the outer circumferential surface of the rotor 100B. Thus, the rotor 100B has a petal shape as a whole.

Figure 6:
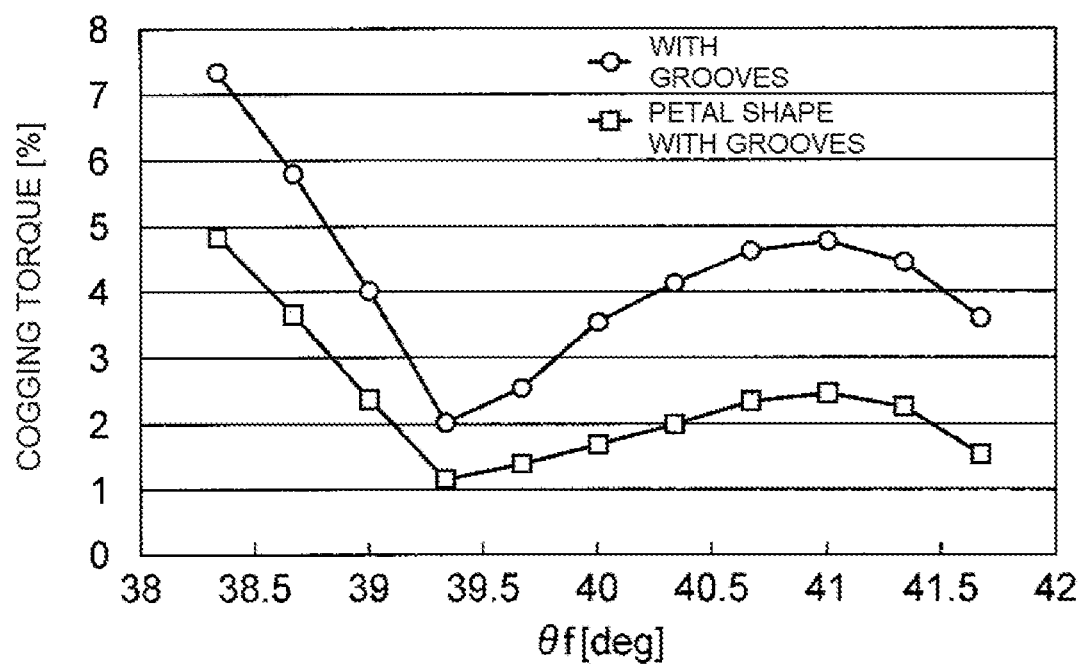
FIG. 6 is a graph showing the characteristic of cogging torque in the IPM motor in the embodiment.

FIG. 6 is a graph showing the relationship between the angle θf and the fluctuation width of cogging torque occurring in the rotor 100B when the angle θf is changed while the angle θs is fixed to 40 degrees in the embodiment. As is understood from comparison with FIG. 4, cogging torque can be further reduced in the petal-shaped rotor 100B as compared with a rotor having a perfectly circular shape.

Although the embodiments of the invention have been described above, other embodiments may be conceived in the invention, for example, as follows.

(1) Although two permanent magnets for each pole are disposed in a V-shape in a rotor and grooves each having a rectangular shape in section are formed in an outer circumferential surface of the rotor in the aforementioned embodiments, the number of permanent magnets constituting each pole, the layout of the permanent magnets and the shape of each groove are not limited thereto.

(2) Although the belt-like magnetic flux short-circuit preventing slits 105a and 105b extending toward the magnetic pole center Pc are formed in the rotor in the aforementioned embodiments, the shape of each magnetic flux short-circuit preventing slit 105a, 105b may be formed desirably. For example, a slit tapered off toward the magnetic pole center Pc may be formed.

What is claimed is:

1. A permanent magnet-embedded type rotary electric machine, comprising:
 a stator which has a plurality of stator winding slots formed in an inner circumferential surface thereof; and
 a rotor which is rotatably supported so that an outer circumferential surface of the rotor can be opposed to the inner circumferential surface of the stator through a gap, the rotor including a first magnetic pole region having one magnetic pole, the first magnetic pole region including
  a pair of permanent magnets embedded in the rotor and forming the one magnetic pole, the pair of permanent magnets forming a axisymmetric shape with respect to a symmetry axis passing through a rotation center of the rotor and a center of the magnetic pole,
  a pair of magnetic flux short-circuit preventing slits arranged in an axisymmetric manner with respect to the symmetry axis, a slit angle, which is a smallest angle around the rotation center between any two points respectively at the pair of slits, being smaller than a magnet angle, which is an angle around the rotation center between two points respectively at the pair of permanent magnets, the two points of the pair of permanent magnets respectively being farthest points from the rotation center at symmetry positions with respect to the symmetry axis; and
  a pair of grooves formed in the outer circumferential surface of the rotor, each groove of the pair of grooves being located at a distance from the other groove of the pair of grooves symmetrically with respect to the symmetry axis, a groove angle, which is a greatest angle around the rotation center between any two points respectively at the pair of groves being smaller than the magnet angle, the groove angle being greater than the slit angle.

2. The permanent magnet-embedded type rotary electric machine according to claim 1, wherein: an outer circumferential shape of the rotor excluding portions of the grooves is a perfectly circular shape.

3. The permanent magnet-embedded type rotary electric machine according to claim 1, wherein: a curvature radius of the outer circumferential surface of the rotor is smaller than a distance between a point on the outer circumferential surface of the rotor closest to the stator and the rotation center of the rotor, and the rotor has a petal shape.

4. The permanent magnet-embedded type rotary electric machine of claim 1, wherein an edge of each groove of the pair of grooves on a magnetic pole boundary side is set at a position closer to a center of the magnetic pole than is a vertex of a permanent magnet embedding slit.

5. The permanent magnet-embedded type rotary electric machine of claim 1, wherein each groove of the pair of grooves that faces the slit of the magnetic flux short-circuit preventing slits is formed in a continuous portion of the outer circumferential surface of the rotor.

6. The permanent magnet-embedded type rotary electric machine of claim 1, wherein each groove of the pair of grooves that faces the slit of the magnetic flux short-circuit preventing slits is formed in a portion of the outer circumferential surface of the rotor that is continuous between an outer edge of a corresponding slit of the magnetic flux short-circuit preventing slits and an outermost periphery of the rotor.

7. The permanent magnet-embedded type rotary electric machine of claim 1, wherein each groove of the pair of grooves that faces the slit of the magnetic flux short-circuit preventing slits is formed in a substantially arc-shaped portion of the outer circumferential surface of the rotor.

8. The permanent magnet-embedded type rotary electric machine of claim 1, wherein the pair of permanent magnets includes two liner-shape permanent magnets forming a V-shape.

9. The permanent magnet-embedded type rotary electric machine of claim 1, wherein the rotor includes a second magnetic pole region, each of the first magnetic pole region and the second magnetic pole region is of an identical structure.

10. The permanent magnet-embedded type rotary electric machine of claim 1, wherein relations are established as:

$$\theta s = n \times \tau s$$

where $\tau s$ designates a pitch of the stator winding slots, which pitch is converted into an angle around the rotation center of the rotor, $\theta s$ designates an angle around the rotation center of the rotor put between the pair of grooves, and n designates a predetermined integer greater than zero, and wherein each groove of the pair of grooves is outside an area corresponding to $\theta s$, and each groove of the pair of grooves faces a slit of the magnetic flux short-circuit preventing slits, and each groove of the pair of grooves is formed as a single concavity in the outer circumferential surface of the rotor.

11. The permanent magnet-embedded type rotary electric machine of claim 10, further comprising:

two permanent magnet embedding slits, wherein a first portion of each of the two permanent magnet embedding slits is within the area corresponding to $\theta s$, and a second portion of each of the two permanent magnet embedding slits is outside the area corresponding to $\theta s$.

12. The permanent magnet-embedded type rotary electric machine of claim 11, wherein a first portion of each of the magnetic flux short-circuit preventing slits extends beyond the second portion of a corresponding one of the two permanent magnet embedding slits in a first direction substantially along a direction in which the corresponding one of the two permanent magnet embedding slits extends, and a second portion of each of the magnetic flux short-circuit preventing slits extends in a second direction, different from the first direction, toward a center of the magnetic pole at least partly along a smooth portion of the outer circumferential surface of the rotor.

13. The permanent magnet-embedded type rotary electric machine according to claim 10, wherein: relations are further established as:

$$\theta f = n \times \tau s$$

where $\theta f$ designates the slit angle.

14. The permanent magnet-embedded type rotary electric machine according to claim 13, wherein: an outer circumferential shape of the rotor excluding portions of the grooves is a substantially circular shape.

15. The permanent magnet-embedded type rotary electric machine according to claim 13, wherein: a curvature radius of the outer circumferential surface of the rotor is smaller than a distance between a point on the outer circumferential surface of the rotor closest to the stator and the rotation center of the rotor, and the rotor has a petal shape.

16. The permanent magnet-embedded type rotary electric machine according to claim 10, wherein: relations are further established as:

$$n \times \tau s - \Delta\theta 1 \leq \theta f \leq n \times \tau s + \Delta\theta 2$$

where $\theta f$ designates the slit angle, and $\Delta\theta 1$ and $\Delta\theta 2$ designate predetermined angles.

17. The permanent magnet-embedded type rotary electric machine according to claim 16, wherein: an outer circumferential shape of the rotor excluding portions of the grooves is a substantially circular shape.

18. The permanent magnet-embedded type rotary electric machine according to claim 16, wherein: a curvature radius of the outer circumferential surface of the rotor is smaller than a distance between a point on the outer circumferential surface of the rotor closest to the stator and the rotation center of the rotor, and the rotor has a petal shape.

* * * * *